United States Patent
Shah et al.

(10) Patent No.: US 12,461,864 B2
(45) Date of Patent: Nov. 4, 2025

(54) SYSTEM AND METHOD FOR RESOURCE-DRIVEN DATAPOINT AGGREGATION OF LIDAR DATAPOINTS EXCHANGED BETWEEN LIDAR SENSOR AND HOST COMPUTING DEVICE AND APPLICATION OF SAME

(71) Applicant: Guangzhou Xiaopeng Autopilot Technology Co., Ltd., Guangdong (CN)

(72) Inventors: Tejash Shah, Mountain View, CA (US); Houman Tavakoli Shiraji, San Diego, CA (US); Ma Jun, Beijing (CN); Wu Gaojin, Beijing (CN)

(73) Assignee: GUANGZHOU XIAOPENG AUTOPILOT TECHNOLOGY CO., LTD., Guangdong (CN)

( * ) Notice: Subject to any disclaimer, the term of this patent is extended or adjusted under 35 U.S.C. 154(b) by 1136 days.

(21) Appl. No.: 17/384,905

(22) Filed: Jul. 26, 2021

(65) Prior Publication Data

US 2023/0023701 A1    Jan. 26, 2023

(51) Int. Cl.
*G06F 13/10* (2006.01)
*G01S 7/48* (2006.01)
*G01S 17/08* (2006.01)

(52) U.S. Cl.
CPC .......... *G06F 13/102* (2013.01); *G01S 7/4808* (2013.01); *G01S 17/08* (2013.01)

(58) Field of Classification Search
CPC ...... G01S 17/08; G01S 7/4808; G06F 13/102; H04L 67/12
See application file for complete search history.

(56) References Cited

U.S. PATENT DOCUMENTS

| | | | |
|---|---|---|---|
| 10,575,310 B2* | 2/2020 | Emmanuel | H04W 28/0236 |
| 2005/0117571 A1* | 6/2005 | Dyke | H04J 3/02 370/376 |
| 2010/0271976 A1* | 10/2010 | Townsley | H04L 12/2872 370/254 |
| 2017/0366445 A1* | 12/2017 | Nemirovsky | H04L 45/12 |
| 2020/0097212 A1* | 3/2020 | Lakshman | G06F 3/0656 |
| 2020/0177266 A1* | 6/2020 | Kang | H04W 74/0833 |

* cited by examiner

*Primary Examiner* — Jason D Recek
(74) *Attorney, Agent, or Firm* — troutman pepper locke; Tim Tingkang Xia, Esq.

(57) ABSTRACT

A system and a method for performing exchange of lidar datapoints between a lidar sensor and a host computing device are provided. The lidar sensor stores a sensor payload size range, and the host computing device stores a host payload size range. When the lidar connection is initiated, the host computing device and the lidar sensor perform handshaking to determine an overlapping range between the host sensor payload size range and the sensor payload size range, and to negotiate an acceptable datapoint payload size based on the overlapping range. Once the handshaking is complete, the lidar connection may be performed using the acceptable data point payload size as a payload size thereof. Thus, the payload size is independent of a maximum transmission unit (MTU) of an Ethernet.

16 Claims, 9 Drawing Sheets

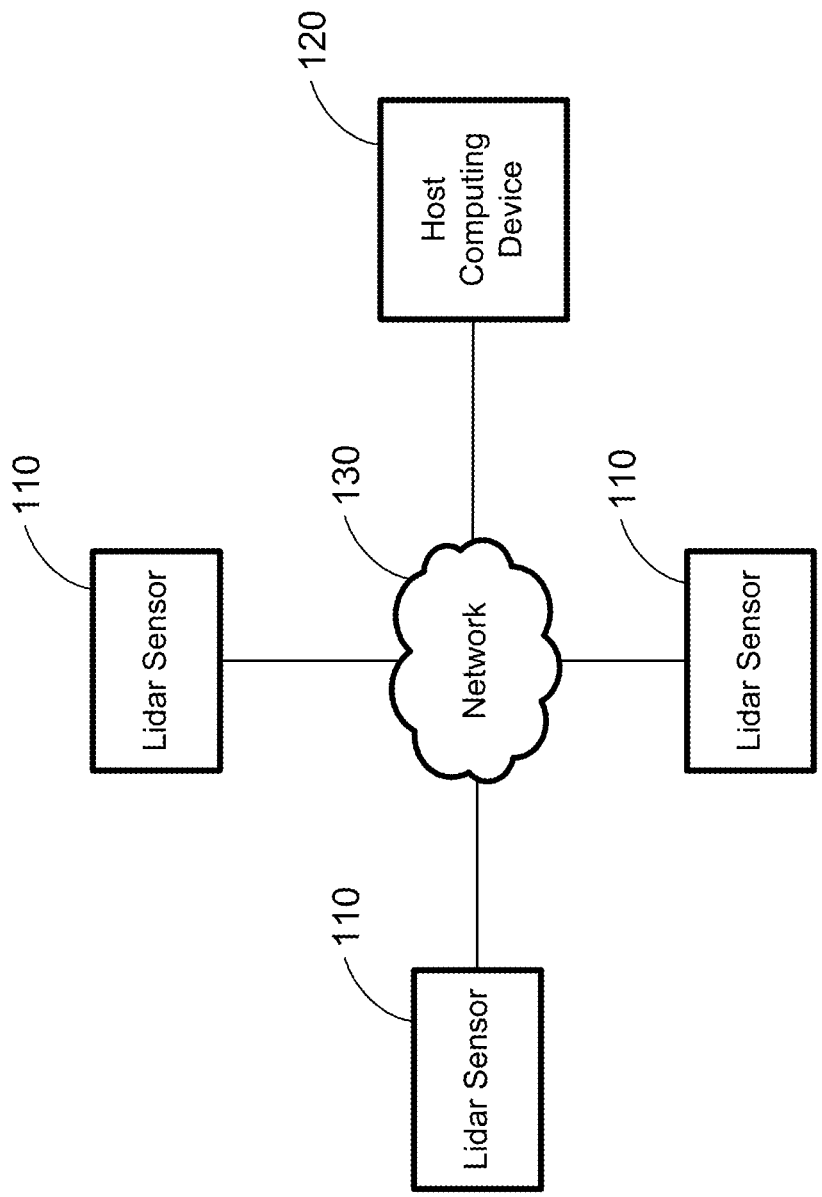

SYSTEM AND METHOD FOR RESOURCE-DRIVEN DATAPOINT AGGREGATION OF LIDAR DATAPOINTS EXCHANGED BETWEEN LIDAR SENSOR AND HOST COMPUTING DEVICE AND APPLICATION OF SAME

FIELD OF THE INVENTION

The present invention relates generally to lidar technology, and more particularly to a system and method for resource-driven datapoint aggregation of lidar data points exchanged between a lidar sensor and a host computing device, and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Lidar (which is an acronym that stands for "LIght Detection And Ranging") is a remote sensing method that uses light in the form of a pulsed laser to measure ranges or variable distances. Specifically, in the lidar technology, a laser is used for targeting an object, and the ranges or variable distances can be obtained by measuring the time for the reflected light to return to the receiver. Lidar is commonly used to in various applications, such as making high-resolution maps, or controlling and navigating for autonomous cars.

In certain applications, a lidar sensor (which may include a laser and a receiver) may be in communication with a host computing device (also known as a laser consumer) to process the ranges or distances obtained by the lidar sensor. The communication between the lidar sensor and the host computing device requires a specific lidar communication protocol, which defines control and data format of frames exchanged between the lidar sensor and the host computing device. One of the factors defined by the protocol is the datapoints frequency, which refers to the datapoints to be sent from the lidar sensor to the host computing device per second. Specifically, the size of a typical single datapoint ranges between 14-20 bytes. Thus, the protocol is defined to aggregate datapoints in a single data message, or a "packet," and the payload size (i.e., the datapoint carrying capacity) of the packet determines the communication efficiency and the resource consumption.

A current approach to determine the payload size is based on the maximum transmission unit (MTU) of the Ethernet, as the lidar communication protocol generally runs on top of the Internet Protocol (IP) and the Ethernet to transmit data over the network. However, such payload size is relatively low, which results in a very high quantity of the packets needed to be transmitted. Due to the higher quantity of packets being transmitted, the CPU usage is significantly increased. Further, the higher quantity of packets also causes higher contention in the interprocess communication at the operation system level and the network level, which may result in packet drop.

Therefore, a heretofore unaddressed need exists in the art to address the aforementioned deficiencies and inadequacies.

SUMMARY OF THE INVENTION

The present invention relates to a system and method for resource-driven datapoint aggregation of lidar data points exchanged between a lidar sensor and a host computing device, and applications of the same. Specifically, the system and method utilizes a solution to negotiate the payload size of the lidar communication protocol between the lidar sensor and the host computing device, such that the payload size is independent of the MTU. Thus, the payload size may be large to balance between the CPU/network usage and the memory buffer provided on the lidar sensor.

In one aspect of the invention, a system for performing exchange of lidar datapoints is provided. In certain embodiments, the system includes a lidar sensor configured to be communicatively connected to a host computing device. The lidar sensor has a processor and a storage device storing computer executable instructions and a sensor payload size range. The computer executable instructions, when executed on the processor, cause the processor to: initiate a lidar connection between the lidar sensor and the host computing device under a lidar communication protocol, wherein the host computing device defines a host payload size range; perform handshaking with the host computing device to determine an overlapping range between the host payload size range and the sensor payload size range, and to negotiate an acceptable datapoint payload size based on the overlapping range; and perform the lidar connection with the host computing device under the lidar communication protocol using the acceptable data point payload size as a payload size of the lidar connection, wherein the payload size is independent of a maximum transmission unit (MTU) of an Ethernet between the lidar sensor and the host computing device.

In another aspect of the present invention, a method for performing exchange of lidar datapoints includes: initiating a lidar connection between a lidar sensor and a host computing device under a lidar communication protocol, wherein the lidar sensor defines a sensor payload size range, and the host computing device defines a host payload size range; performing handshaking between the lidar sensor and the host computing device to determine an overlapping range between the host payload size range and the sensor payload size range, and to negotiate an acceptable datapoint payload size based on the overlapping range; and performing the lidar connection between the lidar sensor and the host computing device under the lidar communication protocol using the acceptable data point payload size as a payload size of the lidar connection, wherein the payload size is independent of a maximum transmission unit (MTU) of an Ethernet between the lidar sensor and the host computing device.

In one embodiment, the lidar connection between the lidar sensor and the host computing device is initiated by establishing a user datagram protocol (UDP) connection between the lidar sensor and the host computing device, and the handshaking is performed through the UDP connection.

In one embodiment, the handshaking is performed by: receiving, by the lidar sensor, a host handshaking message advertised by the host computing device, wherein the host handshaking message includes the host payload size range; determining, by the lidar sensor, whether the overlapping range exists between the host payload size range and the sensor payload size range; and in response to determining the overlapping range exists, selecting, by the lidar sensor, the acceptable datapoint payload size based on the overlapping range, and sending the acceptable datapoint payload size from the lidar sensor to the host computing device to complete the handshaking.

In another aspect of the present invention, a system for performing exchange of lidar datapoints is provided. In certain embodiments, the system includes a host computing device configured to be communicatively connected to a lidar sensor. The host computing device has a processor and a storage device storing computer executable instructions and a host payload size range. The computer executable instructions, when executed on the processor, cause the processor to: initiate a lidar connection between the lidar sensor and the host computing device under a lidar communication protocol, wherein the lidar sensor defines a sensor payload size range; perform handshaking with the lidar sensor to determine an overlapping range between the host payload size range and the sensor payload size range, and to negotiate an acceptable datapoint payload size based on the overlapping range; and perform the lidar connection with the lidar sensor under the lidar communication protocol using the acceptable data point payload size as a payload size of the lidar connection, wherein the payload size is independent of a maximum transmission unit (MTU) of an Ethernet between the lidar sensor and the host computing device.

In one embodiment, the lidar connection between the lidar sensor and the host computing device is initiated by establishing a user datagram protocol (UDP) connection between the lidar sensor and the host computing device, and the handshaking is performed through the UDP connection.

In one embodiment, the handshaking is performed by: sending, by the host computing device to the lidar sensor, a host handshaking message including includes the host payload size range, wherein the lidar sensor is configured to receive the host handshaking message, to determine whether the overlapping range exists between the host payload size range and the sensor payload size range, and in response to determining the overlapping range exists, to select the acceptable datapoint payload size based on the overlapping range; and receiving, by the host computing device from the lidar sensor, the acceptable datapoint payload size to complete the handshaking.

In certain embodiments, in response to determining the overlapping range does not exist, the lidar sensor is configured to terminate the UDP connection between the lidar sensor and the host computing device.

In certain embodiments, the host handshaking message further includes a flag, and the lidar sensor is configured to select the acceptable datapoint payload size by: determining, by a value of the flag, whether a high end or a low end of the overlapping range is used; in response to determining the high end of the overlapping range is used, selecting the high end of the overlapping range as the acceptable datapoint payload size; and in response to determining the low end of the overlapping range is used, selecting the low end of the overlapping range as the acceptable datapoint payload size.

In certain embodiments, the host payload size range is defined by a host low value and a host high value; the sensor payload size range is defined by a sensor low value and a sensor high value; the high end of the overlapping range is a minimum value of the host high value and the sensor high value; and the low end of the overlapping range is a maximum value of the host low value and the sensor low value.

In certain embodiments, the value of the flag is either true or false; when the value of the flag is true, the high end of the overlapping range is used; and when the value of the flag is false, the low end of the overlapping range is used.

Yet another aspect of the present invention relates to non-transitory tangible computer-readable medium storing computer executable instructions which, when executed by one or more processors, cause the method as discussed to be performed.

Yet a further aspect of the invention relates to a vehicle or an autonomous system having the system as described above.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

FIG. 1 shows schematically an overall architecture of a lidar system according to one embodiment of the invention.

DETAILED DESCRIPTION OF THE INVENTION

Figure 2A:
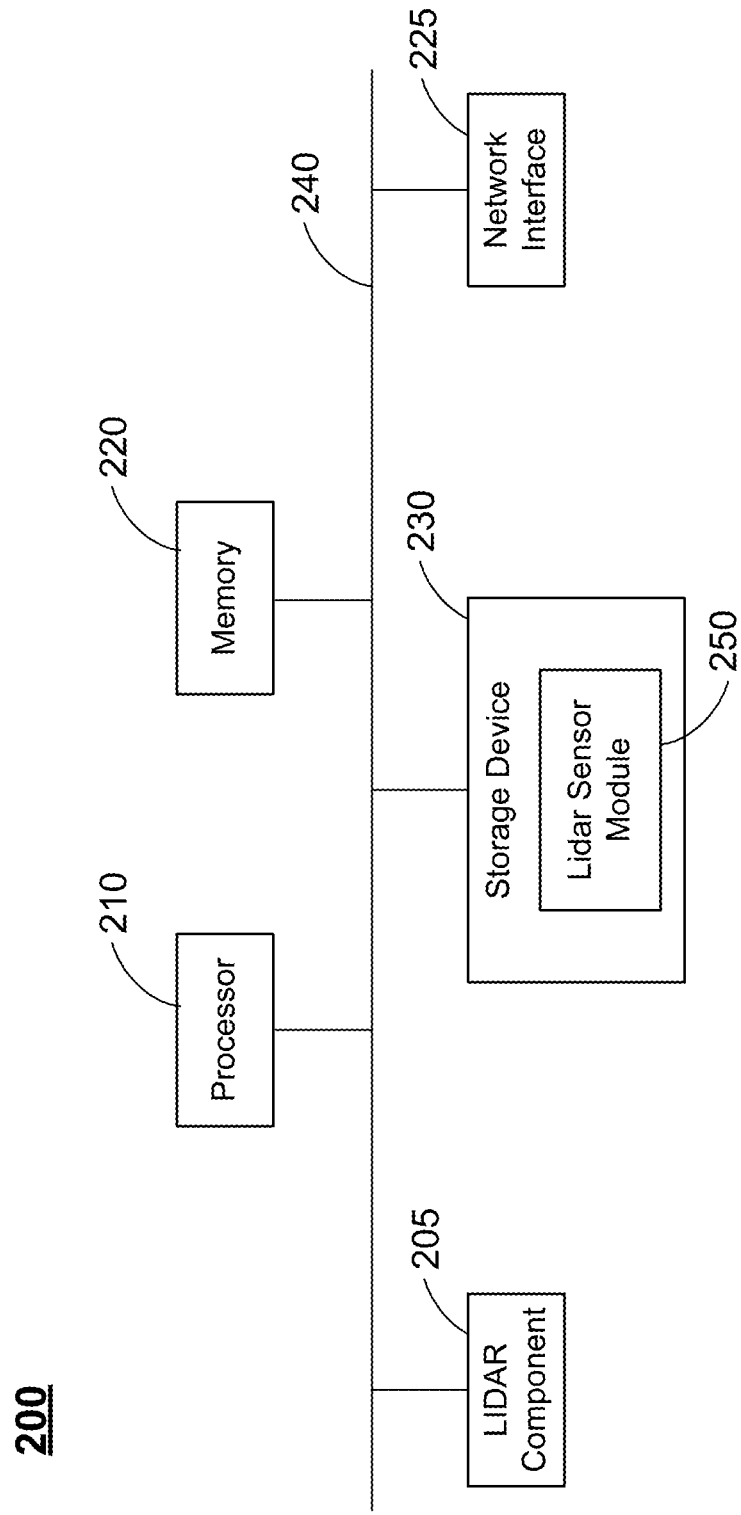
FIG. 2A shows schematically a lidar sensor according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Currently, existing lidar vendors, such as Livox, Ibeo and Luminar, adopt their own lidar communication protocols. Unlike more developed technology such as the camera sensor, which has been in use for decades and is now provided with certain standardized protocols such as the Gigabit Multimedia Serial Link (GMSL) protocol, the lidar technology is still evolving with limited usage, there is no standardized lidar protocol widely adopted by these lidar vendors. However, one common feature of the protocols adopted by these existing lidar vendors exists in that they all use the traditional standard Ethernet interface for the communication between the lidar sensors and the host computing device. For example, the Livox communication protocol provided by Livox company is an open-source protocol which runs on top of the user datagram protocol (UDP). UDP operates on top of the Internet Protocol (IP) to transmit datagrams over a network, and the IP operates on top of the Ethernet. The details of the Livox communication protocol is available as public information, and is not elaborated herein.

As discussed above, in a communication between the lidar sensor and the host computing device under a lidar communication protocol, the protocol is defined to aggregate datapoints in a single data packet, and the payload size of the packet determines the communication efficiency and the resource consumption. However, the current approach to determine the payload size based on the MTU of the Ethernet would result in a relatively low payload size. For example, the MTU value for the Ethernet is 1500 bytes. Thus, by reserving the header lengths for the TCP/IP and the lidar protocol, it is possible that the payload size is relatively low. In certain embodiments, when the Livox communication protocol is used, the fixed payload size may be set to 1362 bytes of datapoints, which is quite low, thus resulting in significantly increased CPU usage and high contention at the operation system level and the network level.

Since the Ethernet interface is commonly used by the lidar communication protocols, one of the solutions to solve the problem caused by the relatively low payload size is to choose a high fixed payload size independent of the Ethernet MTU for the lidar communication protocol. For example, the Livox communication protocol runs on top of UDP, and UDP allows a relatively large payload size of 65K bytes. The same goes with the TCP protocol as well. Thus, it is possible to hard-configure the lidar sensor to have a high fixed payload size based on the UDP/TCP protocol in order to achieve a larger payload size, which may result in a significant CPU usage reduction. The inventors have conducted experiments by increasing the payload size by 15×, which resulted in the CPU usage reduction by about 3×.

The high fixed payload size has some drawbacks. The trade-off of setting a high payload size is the requirement of additional memory/buffer size, and in most of the typical lidar sensors, the ASIC may not have enough buffer capacity to store 65K bytes of datapoints. The actual acceptable payload size may depend upon the flash memory size provided on a given lidar sensor. In other words, a balance between the computational resources of the lidar sensor, such as the memory size, available CPU idle capacity and the IP buffer sizes, must be considered in determining the actual acceptable payload size. However, with all the existing different lidar sensor models and the corresponding host computing devices, both endpoints may not be aware of their computational resources when the lidar connection is to be established, and it would be difficult to set an acceptable payload size.

In view of the aforementioned issues, certain aspects of the present invention provide a system and method for resource-driven datapoint aggregation of lidar data points exchanged between a lidar sensor and a host computing device, in which the handshaking process between the lidar sensor and the host computing device may be used to perform negotiation of the acceptable payload size. For example, the lidar sensor may store a pre-defined sensor payload size range, and the host computing device may store a pre-defined host payload size range, such that the negotiation can be done by determining an overlapping range between the host payload size range and the sensor payload size range and selecting an acceptable datapoint payload size within the overlapping range. In this case, the negotiation of the payload size allows both the lidar sensor and the host computing device to effectively utilize their computational resources such as the CPU, memory and buffer capacity.

FIG. 1 shows schematically an overall architecture of a lidar system according to one embodiment of the invention. As shown in FIG. 1, the system 100 includes a plurality of lidar sensors 110, and each lidar sensor 110 is communicatively connected to a host computing device 120 through a network 130. It should be noted that each lidar sensor 110 is independently operated, and a lidar connection may be established between each lidar sensor 110 and the host computing device 120 through the network 130 under a corresponding lidar communication protocol. In certain embodiments, the lidar connection is a master-slave connection. In one embodiment, in the master-slave lidar connection, the host computing device 120 functions as a master endpoint, and the lidar sensor 110 functions as a slave endpoint. Alternatively, in another embodiment, in the master-slave lidar connection, the host computing device 120 may function as a slave endpoint, and the lidar sensor 110 may functions as a master endpoint.

FIG. 2A shows schematically a lidar sensor according to one embodiment of the invention. Specifically, the lidar sensor 200 as shown in FIG. 2A is used as the lidar sensor 110 of the system 100 as shown in FIG. 1. As shown in FIG. 2A, the lidar sensor 200 includes a lidar component 205, a processor 210, a memory 220, a network interface 225, and a storage device 230, and a bus 240 interconnecting the lidar component 205, the processor 210, the memory 220, the network interface 225 and the storage device 230. In one embodiment, the processor 210, the memory 220 and the storage device 230 may be in the form of an ASIC. In certain embodiments, the lidar sensor 200 may include necessary hardware and/or software components (not shown) to perform its corresponding tasks. Examples of these hardware and/or software components may include, but not limited to, other required memory modules, interfaces, buses, Input/Output (I/O) modules and peripheral devices, and details thereof are not elaborated herein.

The lidar component 205 is the component providing lidar functions. In certain embodiments, the lidar component 205 may include a lidar transceiver, or a combination of a laser and a receiver.

The processor 210 controls operation of the lidar sensor 200, which may be used to execute any computer executable code or instructions. In certain embodiments, the processor 210 may be a central processing unit (CPU), and the computer executable code or instructions being executed by the processor 210 may include an operating system (OS) and other applications, codes or instructions stored in the lidar sensor 200. In certain embodiments, the lidar sensor 200 may run on multiple processors, which may include any suitable number of processors.

The memory 220 may be a volatile memory module, such as the random-access memory (RAM), for storing the data and information during the operation of the lidar sensor 200. In certain embodiments, the memory 220 may be in the form of a volatile memory array. In certain embodiments, the lidar sensor 200 may run on more than one memory 220.

The network interface 225 is an interface for communication with the network. In certain embodiments, the network interface 225 may be an Ethernet interface.

The storage device 230 is a non-volatile storage media or device for storing the computer executable code or instructions, such as the OS and the software applications for the lidar sensor 200. Examples of the storage device 230 may include flash memory, memory cards, USB drives, or other types of non-volatile storage devices such as hard drives, floppy disks, optical drives, or any other types of data storage devices. In certain embodiments, the lidar sensor 200 may have more than one storage device 230, and the software applications of the lidar sensor 200 may be stored in the more than one storage device 230 separately.

Figure 2B:
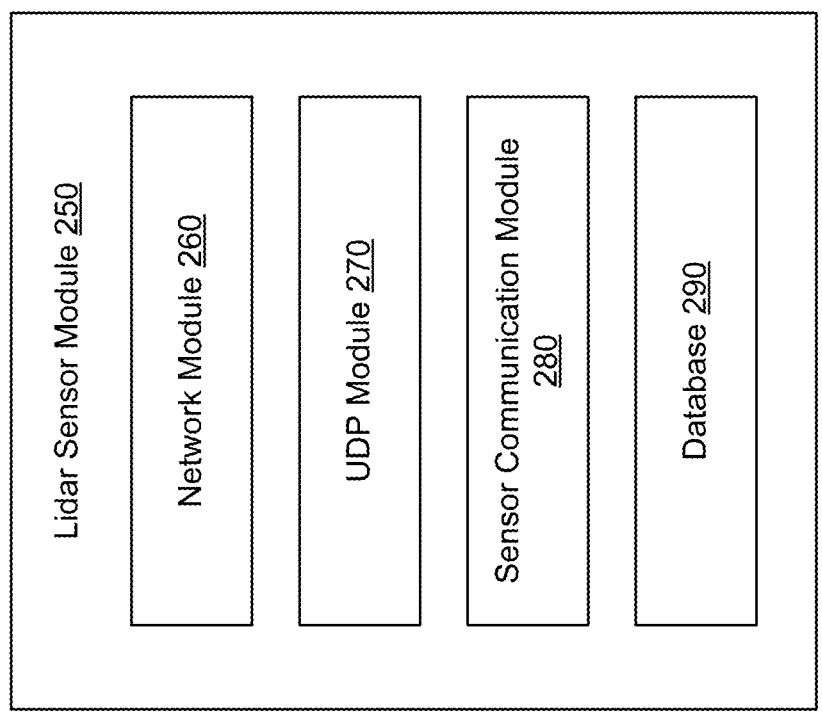
FIG. 2B shows schematically the lidar sensor module in the lidar sensor as shown in FIG. 2A according to one embodiment of the invention.

As shown in FIG. 2A, the computer executable code stored in the storage device 230 may include a lidar sensor module 250. Specifically, the lidar sensor module 250 is in the form of a software module which, when executed, allows the lidar sensor 200 to be in communication with the host computing device through the lidar communication protocol. FIG. 2B shows schematically the lidar sensor module in the lidar sensor as shown in FIG. 2A according to one embodiment of the invention. Specifically, the lidar sensor module 250 as shown in FIG. 2B includes a network module 260, a UDP module 270, a sensor communication module 280, and a database 290.

The network module 260 is used to control the network interface 225 to establish the network connection. In certain embodiments, the network module 260 may be in charge of the Ethernet and TCP/IP control.

The UDP module 270 is used to establish and control the UDP connection between the lidar sensor and the host computing device. As discussed above, some existing lidar communication protocols, such as the Livox communication protocol, run on top of the UDP, and the UDP module 270 may be used to establish the UDP connection in order to initiate the lidar connection between the lidar sensor and the host computing device.

The sensor communication module 280 is used to establish and control the lidar connection between the lidar sensor and the host computing device. Specifically, once the UDP module 270 controls the lidar sensor to establish the UDP connection with the host computing device, the lidar connection is initiated, allowing the sensor communication module 280 at the lidar sensor to perform the handshaking process with the host computing device, and to perform the lidar connection once the handshaking is complete. For example, the lidar sensor may store a pre-defined sensor payload size range, and the host computing device may store a pre-defined host payload size range. In the handshaking process, the lidar sensor and the host computing device may exchange the sensor payload size range and the host payload size range, and the negotiation can be done by determining an overlapping range between the host payload size range and the sensor payload size range and selecting an acceptable datapoint payload size within the overlapping range. Once the handshaking is complete, the sensor communication module 280 may control the lidar sensor to perform the lidar connection with the host computing device under the lidar communication protocol using the acceptable data point payload size as a payload size of the lidar connection. In this case, the payload size is determined by the negotiation between the sensor payload size range and the host payload size range, and is thus independent of the Ethernet MTU.

The database 290 is a database used for storing information necessary for the lidar sensor. Specifically, the database 290 may be used to store the pre-defined sensor payload size range and other information being used in the lidar connection.

Figure 3A:
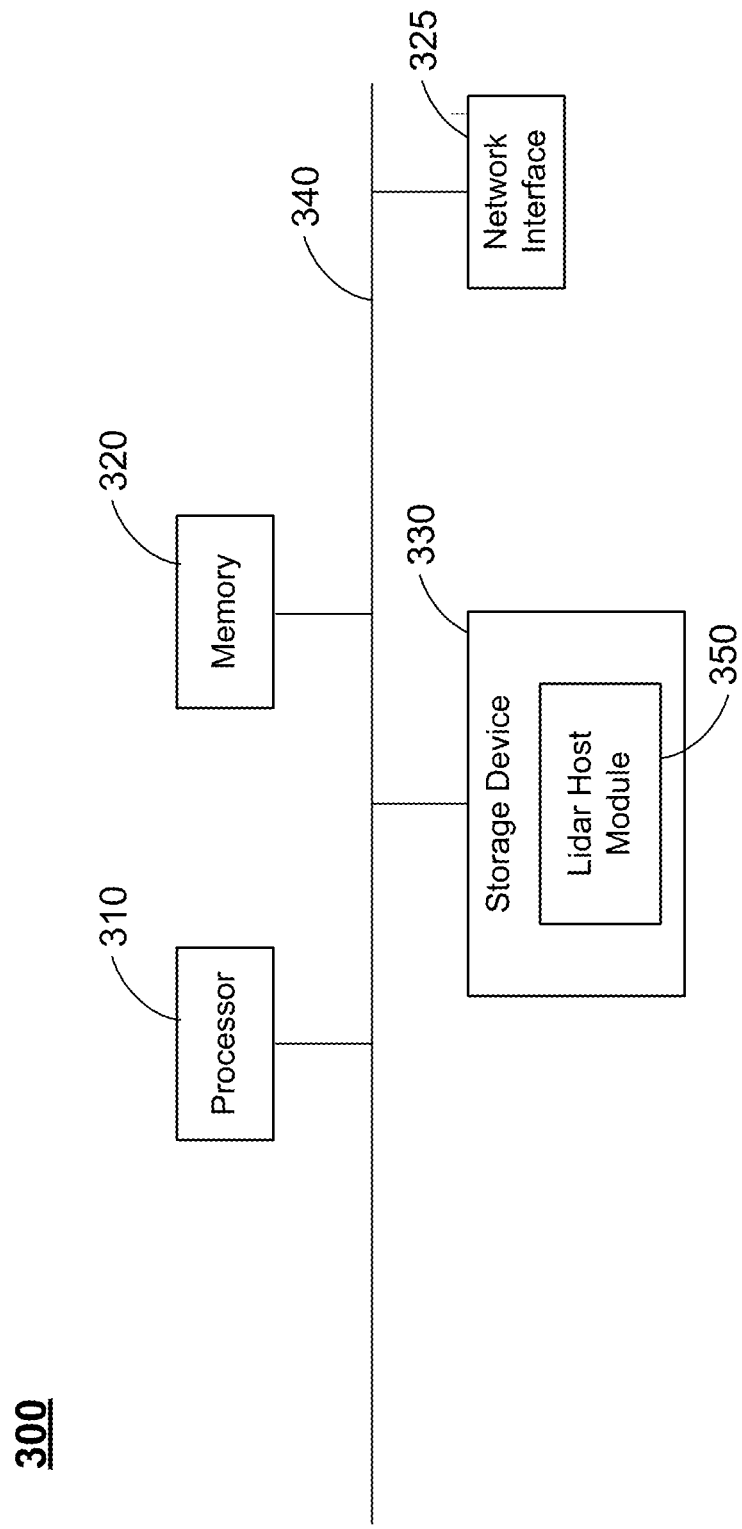
FIG. 3A shows schematically a host computing device sensor according to one embodiment of the invention.

FIG. 3A shows schematically a host computing device sensor according to one embodiment of the invention. Specifically, the host computing device 300 as shown in FIG. 3A is used as the host computing device 120 of the system 100 as shown in FIG. 1. As shown in FIG. 3A, the host computing device 300 includes a processor 310, a memory 320, a network interface 325, and a storage device 330, and a bus 340 interconnecting the processor 310, the memory 320, the network interface 325 and the storage device 330. In certain embodiments, the host computing device 300 may include necessary hardware and/or software components (not shown) to perform its corresponding tasks. Examples of these hardware and/or software components may include, but not limited to, other required memory modules, interfaces, buses, Input/Output (I/O) modules and peripheral devices, and details thereof are not elaborated herein.

The processor 310 controls operation of the host computing device 300, which may be used to execute any computer executable code or instructions. In certain embodiments, the processor 310 may be a central processing unit (CPU), and the computer executable code or instructions being executed by the processor 310 may include an operating system (OS) and other applications, codes or instructions stored in the host computing device 300. In certain embodiments, the host computing device 300 may run on multiple processors, which may include any suitable number of processors.

The memory 320 may be a volatile memory module, such as the random-access memory (RAM), for storing the data and information during the operation of the host computing device 300. In certain embodiments, the memory 320 may be in the form of a volatile memory array. In certain embodiments, the host computing device 300 may run on more than one memory 320.

The network interface 325 is an interface for communication with the network. In certain embodiments, the network interface 325 may be an Ethernet interface.

The storage device 330 is a non-volatile storage media or device for storing the computer executable code or instructions, such as the OS and the software applications for the host computing device 300. Examples of the storage device 330 may include hard drives, optical drives, floppy drives, flash memory, memory cards, USB drives, or other types of data storage devices. In certain embodiments, the host computing device 300 may have more than one storage device 330, and the software applications of the host computing device 300 may be stored in the more than one storage device 330 separately.

Figure 3B:
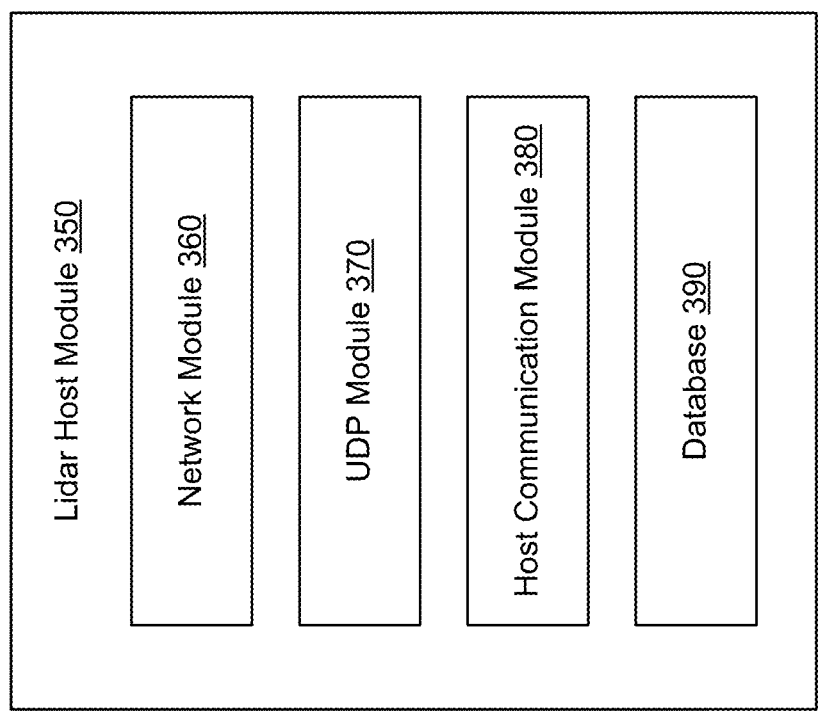
FIG. 3B shows schematically the lidar host module in the host computing device as shown in FIG. 3A according to one embodiment of the invention.

As shown in FIG. 3A, the computer executable code stored in the storage device 330 may include a lidar host module 350. Specifically, the lidar host module 350 is in the form of a software module which, when executed, allows the host computing device 300 to be in communication with the lidar sensor through the lidar communication protocol. FIG. 3B shows schematically the lidar host module in the host computing device as shown in FIG. 3A according to one embodiment of the invention. Specifically, the lidar host module 350 as shown in FIG. 3B includes a network module 360, a UDP module 370, a host communication module 380, and a database 390.

The network module 360 is used to control the network interface 325 to establish the network connection. In certain embodiments, the network module 360 may be in charge of the Ethernet and TCP/IP control.

The UDP module 370 is used to establish and control the UDP connection between the lidar sensor and the host computing device. As discussed above, some existing lidar communication protocols, such as the Livox communication protocol, run on top of the UDP, and the UDP module 370 may be used to establish the UDP connection in order to initiate the lidar connection between the lidar sensor and the host computing device.

The host communication module 380 is used to establish and control the lidar connection between the lidar sensor and the host computing device. Specifically, once the UDP module 370 controls the host computing device to establish the UDP connection with the lidar sensor, the lidar connection is initiated, allowing the host communication module 380 at the host computing device to perform the handshaking process with the lidar sensor, and to perform the lidar connection once the handshaking is complete. For example, the lidar sensor may store a pre-defined sensor payload size range, and the host computing device may store a pre-defined host payload size range. In the handshaking process, the lidar sensor and the host computing device may exchange the sensor payload size range and the host payload size range, and the negotiation can be done by determining an overlapping range between the host payload size range and the sensor payload size range and selecting an acceptable datapoint payload size within the overlapping range. Once the handshaking is complete, the host communication module 380 may control the host computing device to perform the lidar connection with the lidar sensor under the lidar communication protocol using the acceptable data point payload size as a payload size of the lidar connection. In this case, the payload size is determined by the negotiation between the sensor payload size range and the host payload size range, and is thus independent of the Ethernet MTU.

The database 390 is a database used for storing information necessary for the host computing device. Specifically, the database 390 may be used to store the pre-defined host payload size range and other information being used in the lidar connection. In one embodiment, the database 390 may store a flag, which may be used in the negotiation process. Details of the flag and the negotiation will be described later.

Figure 4:
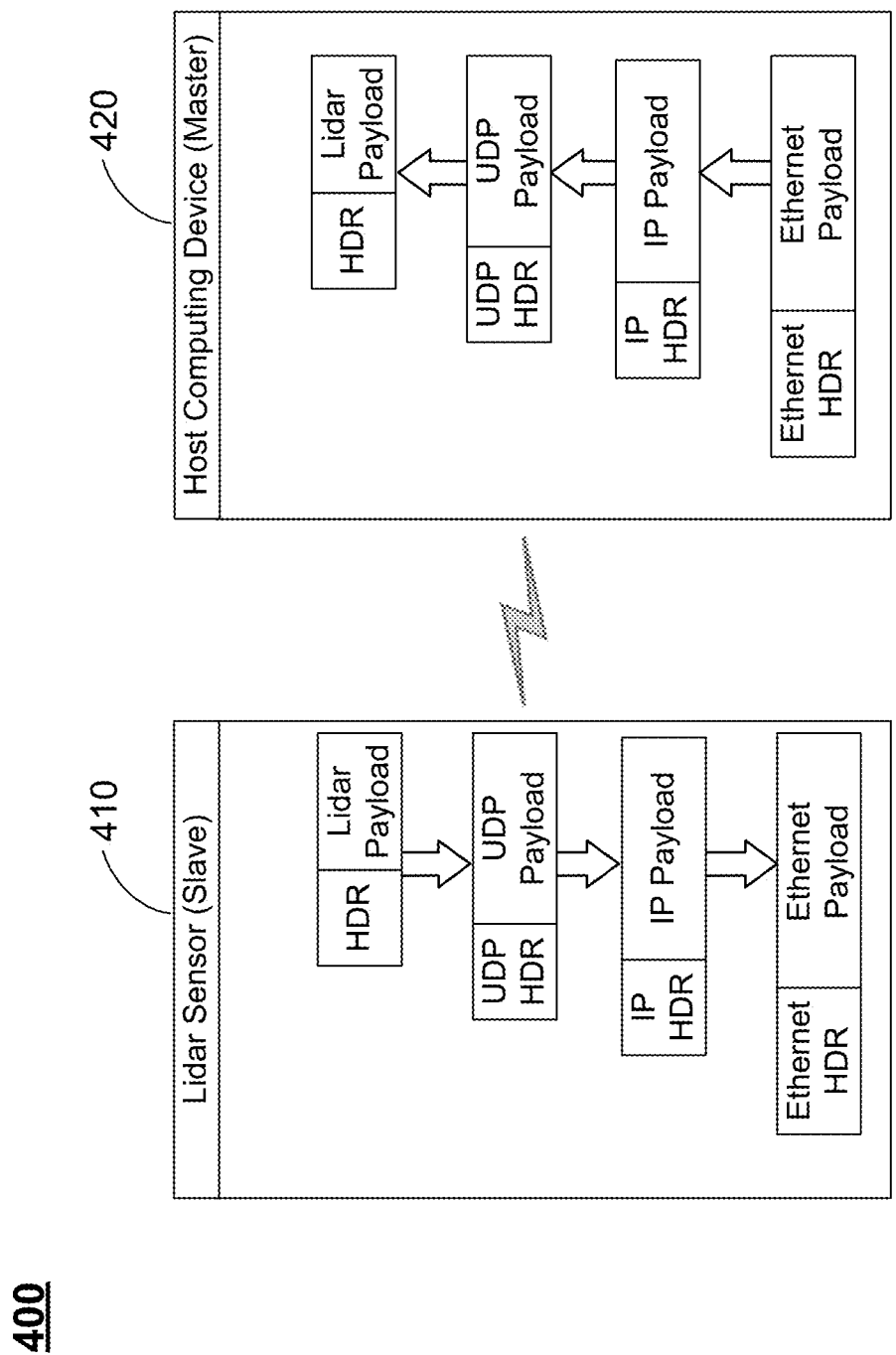
FIG. 4 shows schematically the structure of a data packet in a master-slave lidar system under the lidar communication protocol according to one embodiment of the invention.

In certain embodiments, the lidar sensor 200 as shown in FIGS. 2A and 2B may be used correspondingly with the host computing device 300 as shown in FIGS. 3A and 3B, such that the lidar connection may be established between the lidar sensor 200 and the host computing device 300. As discussed above, some existing lidar communication protocols, such as the Livox communication protocol, run on top of the UDP. Since the UDP operates on top of the IP and the Ethernet, the datapoints to be transmitted may be included as the payload in a data packet under the lidar-UDP-IP-Ethernet structure. For example, FIG. 4 shows schematically the structure of a data packet in a master-slave lidar system under the lidar communication protocol according to one embodiment of the invention. Specifically, in the master-slave lidar system 400 as shown in FIG. 4, the lidar sensor 410 functions as the slave, and the host computing device 420 functions as the master. In particular, the lidar sensor 410 (i.e., slave) is a lidar sensor under the lidar communication protocol that runs on top of the UDP, which may be used as the lidar sensor 200 as shown in FIG. 2A and/or the lidar sensor 110 of the system 100 as shown in FIG. 1. Similarly, the host computing device 420 (i.e., master) is a computing device under the lidar communication protocol that runs on top of the UDP, which may be used as the host computing device 300 as shown in FIG. 3A and/or the host computing device 120 of the system 100 as shown in FIG. 1. As shown in FIG. 4, at the lidar sensor 410, the datapoints to be transmitted may be included as the lidar payload, and the lidar packet (including the header HDR and the lidar payload) may be included in the UDP payload, thus forming a UDP packet (including the UDP HDR and the UDP payload). The UDP packet may then be included in the IP payload, thus forming an IP packet (including the IP HDR and the IP payload). The IP packet may then be included in the Ethernet payload, thus forming an Ethernet packet (including the Ethernet HDR and the Ethernet payload). Once the Ethernet packet is sent from the lidar sensor 410 to the host computing device 420, the host computing device 420 may obtain the datapoints by sequentially obtaining the IP packet from the Ethernet payload, obtaining the UDP packet from the IP payload, and obtaining the lidar packet from the UDP payload.

As disclosed above, in the master-slave lidar system 400 as shown in FIG. 4, the lidar sensor 410 functions as the slave, and the host computing device 420 functions as the master. In an alternative embodiment, it is possible to reverse the roles of master and slave in the master-slave lidar system 400, such that the lidar sensor 410 functions as the master, and the host computing device 420 functions as the slave. In this case, the data packet structure may remain the same.

Figure 5:
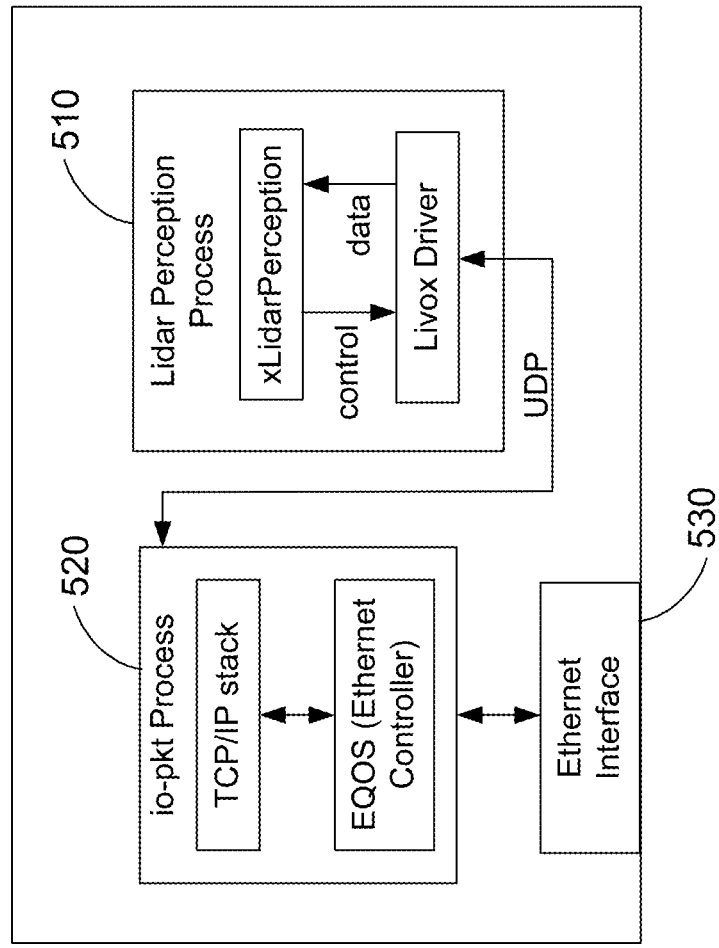
FIG. 5 schematically shows a host computing device used in the lidar system as shown in FIG. 4 according to one embodiment of the invention.

FIG. 5 schematically shows a host computing device used in the lidar system as shown in FIG. 4 according to one embodiment of the invention. Specifically, the host computing device 500 as shown in FIG. 5 is used to communicate with a lidar sensor under the Livox communication protocol, which may be used as the host computing device 420 as shown in FIG. 4, the host computing device 300 as shown in FIG. 3A and/or the host computing device 120 of the system 100 as shown in FIG. 1. As shown in FIG. 5, the host computing device 500 includes a lidar perception process 510, which corresponds to the host communication module 380 as shown in FIG. 3B, and an I/O-packet (io-pkt) process 520, which corresponds to the network module 360 as shown in FIG. 3B, and controls the Ethernet interface 530. The connection between the two processes 510 and 520 are implemented by UDP, which corresponds to the UDP module 370 as shown in FIG. 3B.

In the embodiments as shown in FIGS. 2B, 3B, 4 and 5, the UDP is required because the lidar communication protocol is a protocol runs on top of the UDP, such as the existing Livox communication protocol. In certain embodiments, it is also possible that the lidar communication protocol does not run on top of the UDP, and instead, the lidar communication protocol runs directly on top of the TCP/IP. In this case, the lidar connection between the lidar sensor and the host computing device may be initiated by establishing the TCP/IP connection between the lidar sensor and the host computing device, and the handshaking is performed through the TCP/IP connection.

Figure 6:
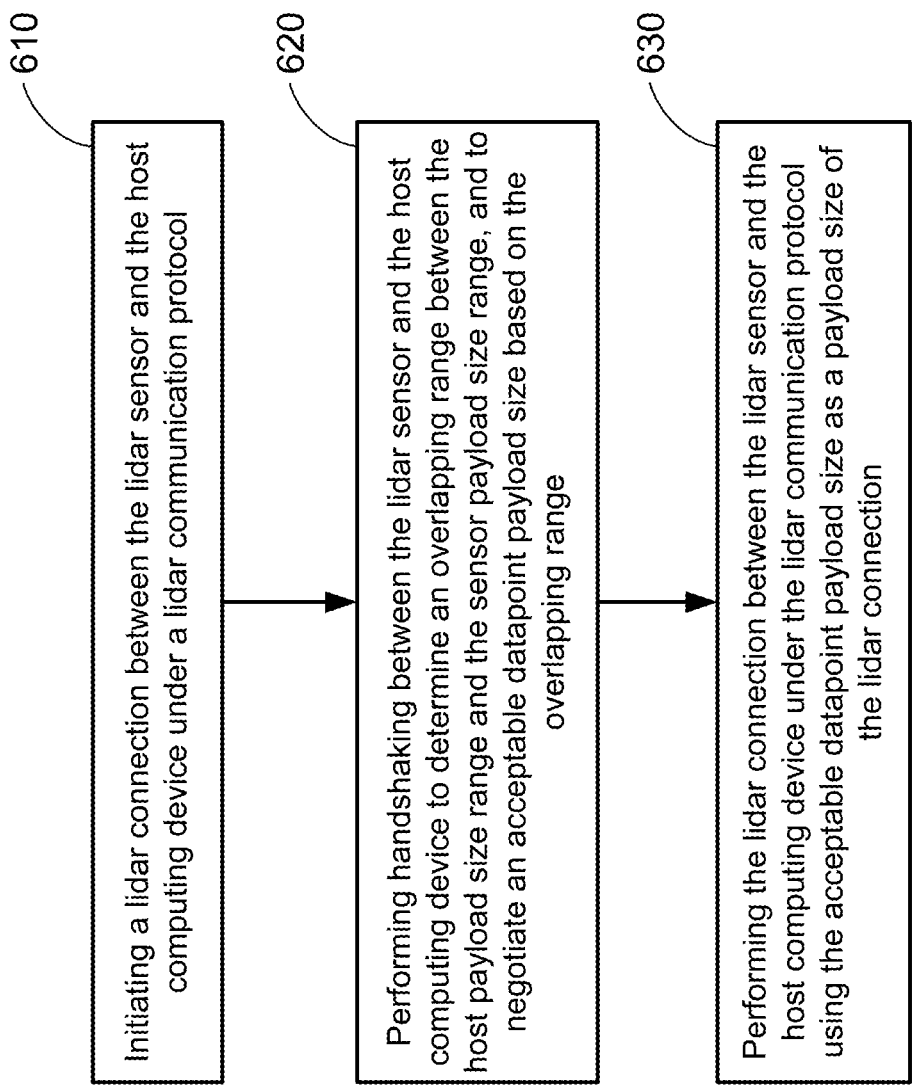
FIG. 6 shows a flowchart of a method for performing exchange of lidar datapoints according to certain embodiments of the invention.

In another aspect of the present invention, a method for performing exchange of lidar datapoints is provided. For example, FIG. 6 shows a flowchart of a method for performing exchange of lidar datapoints according to certain embodiments of the invention. In certain embodiments, the method as shown in FIG. 6 may be implemented by the system 100 as shown in FIG. 1 and/or the system 400 as shown in FIG. 4. It should be particularly noted that, unless otherwise stated in the present disclosure, the steps of the method may be arranged in a different sequential order, and are thus not limited to the sequential order as shown in FIG. 6.

As shown in FIG. 6, at the process 610, the lidar sensor may initiate a lidar connection between the lidar sensor and the host computing device under a specific lidar communication protocol. For example, the lidar connection may be initiated by establishing a UDP connection between the lidar sensor and the host computing device, such that the subsequent handshaking process may be performed through the UDP connection. In certain embodiments, the lidar connection may be a master-slave lidar connection. At the process 620, the lidar sensor and the host computing device may perform handshaking to determine an overlapping range between the host payload size range and the sensor payload size range, and to negotiate an acceptable datapoint payload size based on the overlapping range. Once the handshaking and the negotiation of the acceptable datapoint payload size are complete, at the process 630, the lidar connection between the lidar sensor and the host computing device may be performed under the lidar communication protocol using the acceptable datapoint payload size as the payload size of the lidar connection. In this case, the payload size would be independent of the Ethernet MTU.

In certain embodiments, the handshaking and negotiation process may be initiated by either one of the lidar sensor and the host computing device. For example, the host computing device may advertise the host payload size range with a host handshaking message. Once the lidar sensor receives the host handshaking message, the lidar sensor may retrieve the host payload size range, and compare the host payload size range with the sensor payload size range to determine whether the overlapping range exists between the host payload size range and the sensor payload size range. If the overlapping range exists, the lidar sensor may determine the acceptable datapoint payload size based on the overlapping range, and send the acceptable datapoint payload size back to the host computing device as an acknowledgement handshaking message.

Figure 7:
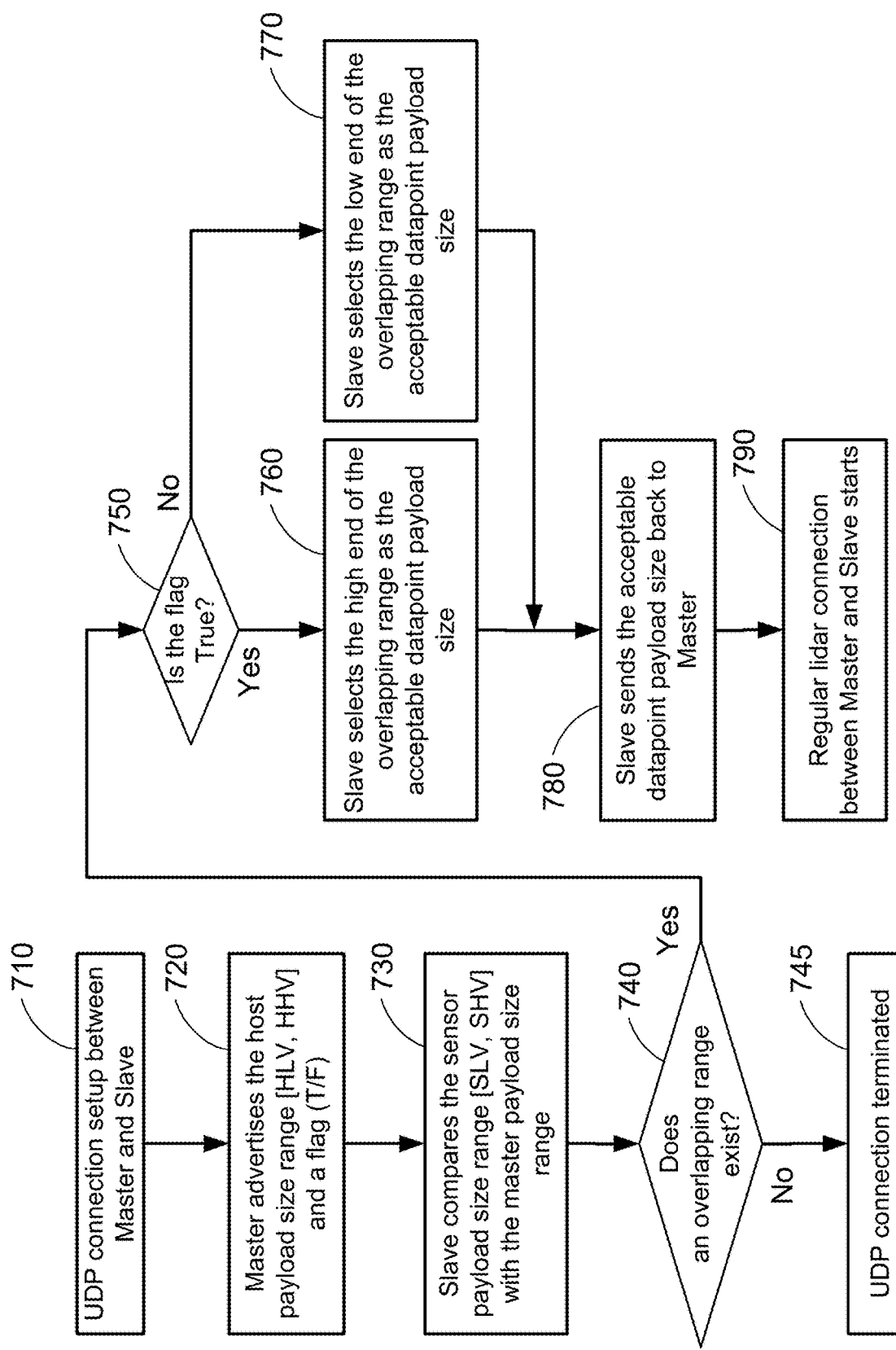
FIG. 7 shows a flowchart of a detailed method for performing exchange of lidar datapoints according to one embodiment of the invention.

FIG. 7 shows a flowchart of a detailed method for performing exchange of lidar datapoints according to one embodiment of the invention. In certain embodiments, the method as shown in FIG. 7 is a detailed embodiment of the method as shown in FIG. 6, which may be performed on a master-slave system, where the host computing device functions as the master and the lidar sensor functions as the slave. For example, the master-slave system may be implemented by the system 100 as shown in FIG. 1 and/or the system 400 as shown in FIG. 4. It should be particularly noted that, unless otherwise stated in the present disclosure, the steps of the method may be arranged in a different sequential order, and are thus not limited to the sequential order as shown in FIG. 7.

As shown in FIG. 7, at the process 710, the UDP connection is established and setup between the master (i.e., the host computing device) and the slave (i.e., the lidar sensor), such that the lidar connection between the master and the slave is initiated, and the subsequent handshaking and negotiation process may be performed through the UDP connection. At the process 720, the master (i.e., the host computing device) advertises the host payload size range and a flag in a host handshaking message. Specifically, the host payload size range is defined by [HLV, HHV], in which HLV represents a host low value and HHV represents a host high value. For example, the host payload size range may be [3000, 20000], in which HLV=3000 and HHV=20000. The flag is a T/F flag, which has a value of either True or False.

When the slave (i.e., the lidar sensor) receives the host handshaking message from the master (i.e., the host computing device), at the process 730, the slave compares the sensor payload size range with the host payload size range. Specifically, the sensor payload size range is defined by [SLV, SHV], in which SLV represents a sensor low value and SHV represents a sensor high value. For example, the sensor payload size range may be [5000, 15000], in which SLV=5000 and SHV=15000. At the process 740, the slave determines whether an overlapping range exists between the host payload size range and the sensor payload size range. Specifically, the overlapping range has a high end, which is a minimum value of the host high value and the sensor high value, and a low end, which is a maximum value of the host low value and the sensor low value. In other words, the overlapping range may be [max(HLV, SLV), min(HHV, SHV)]. For example, in the case where the host payload size range is [3000, 20000] and the sensor payload size range is [5000, 15000], the overlapping range is [5000, 15000].

As discussed above, the overlapping range may be [max(HLV, SLV), min(HHV, SHV)]. However, the low end of the overlapping range must be no greater than the high end of the overlapping range. In other words, if max(HLV, SLV) >min(HHV, SHV), the overlapping range does not exist. For example, in a hypothetical case where the host payload size range is [3000, 7500] and the sensor payload size range is [8000, 15000], the overlapping range does not exist, as such overlapping range would become [8000, 7500], which is invalid as 8000>7500. When it is determined that the overlapping range does not exist, it implies no payload size is acceptable to both endpoints. Thus, at the process 745, the slave terminates the UDP connection, On the other hand, if the overlapping range exists, at the process 750, the slave (i.e., the lidar sensor) further checks the value of the flag being True or False. If the value of the flag is True, it indicates that the high end of the overlapping range min(HHV, SHV) is used as the acceptable datapoint payload size. Thus, at the process 760, the slave selects the high end of the overlapping range as the acceptable datapoint payload size. Alternatively, if the value of the flag is False, it indicates that the low end of the overlapping range max(HLV, SLV) is used as the acceptable datapoint payload size. Thus, at the process 770, the slave selects the low end of the overlapping range as the acceptable datapoint payload size. Once the acceptable datapoint payload size is determined, at the process 780, the slave sends the acceptable datapoint payload size back to the master in an acknowledgement handshaking message. Thus, the handshaking and negotiation of the acceptable datapoint payload size are complete. At the process 790, the regular lidar connection between the master and the slave may start. The advantage of this method exists in that it allows both master and slave to effectively utilize its computational resources, such as CPU, memory, buffer capacity, etc.

In the embodiment as shown in FIG. 7, the handshaking process is initiated by the master (i.e., the host computing device), and the exchange of the host payload size range and the sensor payload size range is done by the master (i.e., the host computing device) sending the host payload size range and the flag to the slave (i.e., the lidar sensor), and the slave (i.e., the lidar sensor) comparing the host payload size range with the sensor payload size range. In an alternative embodiment, the handshaking process may be initiated by the slave (i.e., the lidar sensor), and the exchange of the host payload size range and the sensor payload size range may be done by the slave (i.e., the lidar sensor) sending the sensor payload size range and the flag to the master (i.e., the host computing device), and the master (i.e., the host computing device) comparing the sensor payload size range with the host payload size range.

Further, in the embodiment as shown in FIG. 7, the host computing device functions as the master, and the lidar sensor functions as the slave. In an alternative embodiment, it is also possible for the host computing device to function as the slave, and in this case, the lidar sensor functions as the master.

In certain embodiments, the method as shown in FIG. 7 can be extended for multiple lidar sensors (i.e., multiple slaves) and multiple host computing devices (i.e., multiple masters) by all of them involved in the negotiation. In this way, if a certain master-slave pair cannot find an overlapping range, another master-slave pair may be able to find an overlapping range.

Yet another aspect of the invention provides a non-transitory tangible computer-readable medium storing instructions which, when executed by one or more processors of a system (such as the system 100 as shown in FIG. 1 or the system 400 as shown in FIG. 4), cause the above disclosed method to be performed. The computer executable instructions or program codes enable the above disclosed system or a similar system, to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

What is claimed is:

1. A system for performing exchange of lidar datapoints, comprising:
   a lidar sensor configured to be communicatively connected to a host computing device, wherein the lidar sensor has a processor and a storage device storing computer executable instructions and a sensor payload size range, and the computer executable instructions, when executed on the processor, cause the processor to:

initiate a lidar connection between the lidar sensor and the host computing device under a lidar communication protocol by establishing a user datagram protocol (UDP) connection between the lidar sensor and the host computing device, wherein the host computing device defines a host payload size range;

perform handshaking with the host computing device through the UDP connection to determine an overlapping range between the host payload size range and the sensor payload size range, and to negotiate an acceptable datapoint payload size based on the overlapping range; and perform the lidar connection with the host computing device under the lidar communication protocol using the acceptable data point payload size as a payload size of the lidar connection, wherein the payload size is independent of a maximum transmission unit (MTU) of an Ethernet between the lidar sensor and the host computing device, wherein the handshaking is performed by:
receiving, by the lidar sensor, a host handshaking message advertised by the host computing device, wherein the host handshaking message includes the host payload size range;

determining, by the lidar sensor, whether the overlapping range exists between the host payload size range and the sensor payload size range; and in response to determining the overlapping range exists, selecting, by the lidar sensor, the acceptable datapoint payload size based on the overlapping range, and sending the acceptable datapoint payload size from the lidar sensor to the host computing device to complete the handshaking.

2. The system of claim 1, wherein the host handshaking message further includes a flag, and the lidar sensor is configured to select the acceptable datapoint payload size by:

determining, by a value of the flag, whether a high end or a low end of the overlapping range is used;

in response to determining the high end of the overlapping range is used, selecting the high end of the overlapping range as the acceptable datapoint payload size; and in response to determining the low end of the overlapping range is used, selecting the low end of the overlapping range as the acceptable datapoint payload size.

3. The system of claim 2, wherein:
the host payload size range is defined by a host low value and a host high value;
the sensor payload size range is defined by a sensor low value and a sensor high value;
the high end of the overlapping range is a minimum value of the host high value and the sensor high value; and
the low end of the overlapping range is a maximum value of the host low value and the sensor low value.

4. The system of claim 2, wherein:
the value of the flag is either true or false;
when the value of the flag is true, the high end of the overlapping range is used; and
when the value of the flag is false, the low end of the overlapping range is used.

5. The system of claim 1, wherein in response to determining the overlapping range does not exist, the lidar sensor is configured to terminate the UDP connection between the lidar sensor and the host computing device.

6. A system for performing exchange of lidar datapoints, comprising:

a host computing device configured to be communicatively connected to a lidar sensor, wherein the host computing device has a processor and a storage device storing computer executable instructions and a host payload size range, and the computer executable instructions, when executed on the processor, cause the processor to:

initiate a lidar connection between the lidar sensor and the host computing device under a lidar communication protocol by establishing a user datagram protocol (UDP) connection between the lidar sensor and the host computing device, wherein the lidar sensor defines a sensor payload size range;

perform handshaking with the lidar sensor through the UDP connection to determine an overlapping range between the host payload size range and the sensor payload size range, and to negotiate an acceptable datapoint payload size based on the overlapping range; and perform the lidar connection with the lidar sensor under the lidar communication protocol using the acceptable data point payload size as a payload size of the lidar connection, wherein the payload size is independent of a maximum transmission unit (MTU) of an Ethernet between the lidar sensor and the host computing device, wherein the handshaking is performed by:
sending, by the host computing device to the lidar sensor, a host handshaking message including includes the host payload size range, wherein the lidar sensor is configured to receive the host handshaking message, to determine whether the overlapping range exists between the host payload size range and the sensor payload size range, and in response to determining the overlapping range exists, to select the acceptable datapoint payload size based on the overlapping range; and receiving, by the host computing device from the lidar sensor, the acceptable datapoint payload size to complete the handshaking.

7. The apparatus of claim 6, wherein the host handshaking message further includes a flag, and the lidar sensor is configured to select the acceptable datapoint payload size by:

determining, by a value of the flag, whether a high end or a low end of the overlapping range is used;

in response to determining the high end of the overlapping range is used, selecting the high end of the overlapping range as the acceptable datapoint payload size; and in response to determining the low end of the overlapping range is used, selecting the low end of the overlapping range as the acceptable datapoint payload size.

8. The apparatus of claim 7, wherein:
the value of the flag is either true or false; and
when the value of the flag is true, the high end of the overlapping range is used; and
when the value of the flag is false, the low end of the overlapping range is used.

9. The apparatus of claim 7, wherein:
the host payload size range is defined by a host low value and a host high value;
the sensor payload size range is defined by a sensor low value and a sensor high value;
the high end of the overlapping range is a minimum value of the host high value and the sensor high value; and the low end of the overlapping range is a maximum value of the host low value and the sensor low value.

10. The apparatus of claim 6, wherein in response to determining the overlapping range does not exist, the lidar sensor is configured to terminate the UDP connection between the lidar sensor and the host computing device.

11. A method for performing exchange of lidar datapoints, comprising:
initiating a lidar connection between a lidar sensor and a host computing device under a lidar communication protocol by establishing a user datagram protocol (UDP) connection between the lidar sensor and the host computing device, wherein the lidar sensor defines a sensor payload size range, and the host computing device defines a host payload size range;
performing handshaking between the lidar sensor and the host computing device through the UDP connection to determine an overlapping range between the host payload size range and the sensor payload size range, and to negotiate an acceptable datapoint payload size based on the overlapping range; and
performing the lidar connection between the lidar sensor and the host computing device under the lidar communication protocol using the acceptable data point payload size as a payload size of the lidar connection, wherein the payload size is independent of a maximum transmission unit (MTU) of an Ethernet between the lidar sensor and the host computing device,
wherein the handshaking is performed by:
receiving, by the lidar sensor, a host handshaking message advertised by the host computing device, wherein the host handshaking message includes the host payload size range;
determining, by the lidar sensor, whether the overlapping range exists between the host payload size range and the sensor payload size range; and
in response to determining the overlapping range exists, selecting, by the lidar sensor, the acceptable datapoint payload size based on the overlapping range, and sending the acceptable datapoint payload size from the lidar sensor to the host computing device to complete the handshaking between the lidar sensor and the host computing device.

12. The method of claim 11, further comprising:
in response to determining the overlapping range does not exist, terminating the UDP connection between the lidar sensor and the host computing device.

13. The method of claim 11, wherein the host handshaking message further includes a flag, and the acceptable datapoint payload size is selected by:
determining, by a value of the flag, whether a high end or a low end of the overlapping range is used;
in response to determining the high end of the overlapping range is used, selecting the high end of the overlapping range as the acceptable datapoint payload size; and
in response to determining the low end of the overlapping range is used, selecting the low end of the overlapping range as the acceptable datapoint payload size.

14. The method of claim 13, wherein:
the host payload size range is defined by a host low value and a host high value;
the sensor payload size range is defined by a sensor low value and a sensor high value;
the high end of the overlapping range is a minimum value of the host high value and the sensor high value; and
the low end of the overlapping range is a maximum value of the host low value and the sensor low value.

15. The method of claim 13, wherein:
the value of the flag is either true or false;
when the value of the flag is true, the high end of the overlapping range is used; and
when the value of the flag is false, the low end of the overlapping range is used.

16. A non-transitory tangible computer-readable medium storing computer executable instructions which, when executed by one or more processors of a lidar sensor, cause a method of claim 11 to be performed.

* * * * *